United States Patent
Feridun et al.

(10) Patent No.: US 10,705,937 B2
(45) Date of Patent: *Jul. 7, 2020

(54) COMPUTING RESIDUAL RESOURCE CONSUMPTION FOR TOP-K DATA REPORTS

(71) Applicant: International Business Machines Corporation, Armonk, NY (US)

(72) Inventors: Metin Feridun, Thalwil (CH); Thomas Gschwind, Zurich (CH)

(73) Assignee: International Business Machines Corporation, Armonk, NY (US)

(*) Notice: Subject to any disclaimer, the term of this patent is extended or adjusted under 35 U.S.C. 154(b) by 242 days.

This patent is subject to a terminal disclaimer.

(21) Appl. No.: 15/804,613

(22) Filed: Nov. 6, 2017

(65) Prior Publication Data

US 2018/0276099 A1    Sep. 27, 2018

Related U.S. Application Data

(63) Continuation of application No. 15/470,244, filed on Mar. 27, 2017, now Pat. No. 10,248,529.

(51) Int. Cl.
   *G06F 11/30*    (2006.01)
   *G06F 11/34*    (2006.01)

(52) U.S. Cl.
   CPC ...... *G06F 11/3065* (2013.01); *G06F 11/3003* (2013.01); *G06F 11/3409* (2013.01); *G06F 11/3442* (2013.01); *G06F 11/3466* (2013.01)

(58) Field of Classification Search
   CPC .......... G06F 11/3003; G06F 11/3065; G06F 11/3409; G06F 11/3442; G06F 11/3466

(Continued)

(56) References Cited

U.S. PATENT DOCUMENTS 9,152,667 B1    10/2015  Wu et al.
10,248,529 B2*  4/2019  Feridun ............... G06F 11/3003

(Continued)

OTHER PUBLICATIONS

Yang et al. "An Optimal Strategy for Monitoring Top-k Queries in Streaming Windows", EDBT 2011, Mar. 22-24, 2011, Upsala, Sweden.

(Continued)

*Primary Examiner* — John H Le
(74) *Attorney, Agent, or Firm* — Scully, Scott, Murphy & Presser, P.C.; Daniel Morris, Esq.

(57) ABSTRACT

Methods for providing the capability to resample computer system metrics, while providing improved accuracy over conventional techniques. The system and method conducts monitoring and measuring metrics of system resource consumption of a plurality of entities to generate resource consumption data, generating a report of the resource consumption data for the plurality of entities for each of a plurality of time periods, identifying a number, k, of the plurality of entities as top-k consumers of resources for each of the plurality of time periods, identifying at least one residual entity of the plurality of entities whose resource consumption is not included in the top-k entities based on residual resource consumption data of the entity, and resampling the reports of the resource consumption data corresponding to the top-k entities and to the at least one residual entity to form at least one report covering a time period.

3 Claims, 5 Drawing Sheets

(58) Field of Classification Search
USPC .................................. 702/185, 186; 707/737
See application file for complete search history.

(56) References Cited

U.S. PATENT DOCUMENTS

| | | |
|---|---|---|
| 2005/0021306 A1 | 1/2005 | Garcea et al. |
| 2007/0174256 A1 | 7/2007 | Morris et al. |
| 2011/0153603 A1 | 6/2011 | Adiba et al. |

OTHER PUBLICATIONS

Metwally, et al., "Efficent Computation of Frequent and Top-k Elements in Data Streams", ICDT'05 Proceedings of the 10th international conference on Database Theory, pp. 398-412 , Edinburgh, UK—Jan. 5-7, 2005.
Office Action dated Jul. 11, 2018, received in a related U.S. Appl. No. 15/470,244.

* cited by examiner

COMPUTING RESIDUAL RESOURCE CONSUMPTION FOR TOP-K DATA REPORTS

BACKGROUND

The present invention relates to techniques for computing residual resource consumption for top-k data reports, and in particular, relates to resampling of resource consumption reports so as to include long term resource consumption.

Monitoring systems are important to performance management of computer systems because they may collect a wide range of different types of metrics representing the state of the computer system. Typically, such monitoring systems keep newer metrics at a high sampling rate, whereas older metrics are resampled to a lower sampling rate. For standard metric types, such as quantities and counters, resampling the data is straight forward. However, to observe computing clusters, other metric types, such as the top-k processes consuming a given resource (such as CPU time, memory, etc.) may be preferable.

Top-k metrics report the top-k entities consuming a particular resource over a given time window (for example, a time window of 10 seconds). If such reports are to be resampled, multiple reports may be taken together to form a new top-k report covering a larger time window (for example, 30 seconds). Problems may occur in that the 3 10 second reports may not be representative for resources consumed over the 30 second window.

Accordingly, a need arises for a technique by which computer system metrics may be resampled that provides improved accuracy over conventional techniques.

SUMMARY

Embodiments of the present methods and systems may provide the capability to resample computer system metrics, while providing improved accuracy over conventional techniques. For example, embodiments of the present methods and systems may not only collect the top-k entities consuming resources in a given time window, but may also derive for each entity so called residual resource consumption data. This residual resource consumption data may capture long term resource consumption of the entity being monitored. During resampling, this information may be taken into account in order to consider long term resource consumption that may be missed during conventional resampling.

For example, in an embodiment, a computer-implemented method for monitoring computer system operation may comprise monitoring and measuring metrics of system resource consumption of a plurality of entities in at least one computer system to generate resource consumption data, generating a report of the system resource consumption data for the plurality of entities for each of a plurality of time periods, identifying a number, k, of the plurality of entities as top-k consumers of computer system resources for each of the plurality of time periods, and identifying at least one residual entity of the plurality of entities whose resource consumption is not included in the top-k entities based on residual resource consumption data of the entity for the plurality of time periods.

For example, in an embodiment, the method may further comprise resampling the reports of the system resource consumption data corresponding to the top-k entities and to the at least one residual entity to form at least one report covering a time period including the plurality of time periods. Identifying at least one residual entity may comprise determining, for each entity other than the top-k entities, whether the current time period resources used by the entity minus the last time period resources used by the entity is greater than the resources used by any top-k entity during the time period and if so, adding the identified entity as a residual entity. Identifying at least one residual entity may comprise determining, for each entity other than the top-k entities, whether the resources used by the entity accumulated over the plurality of time periods is greater than the resources used by any top-k entity during any of the plurality of time periods and if so, adding the identified entity as a residual entity. Identifying at least one residual entity may comprise determining, for each entity other than the top-k entities, whether the resources used by the entity in any of the plurality of time periods is greater than the resources used by any top-k entity during any of the plurality of time periods and if so, adding the identified entity as a residual entity. Residual resource consumption data may capture long term resource consumption data of the entity other than the top-k entities. Long term resource consumption data may be used during resampling to provide consideration of long term resource consumption not included in resource consumption of the top-k entities. Residual resource consumption data may capture long term resource consumption data of an entity that was included in the top-k entities, but is no longer included in the top-k entities due to the resampling.

For example, in an embodiment, a system for monitoring computer system operation may comprise a processor, memory accessible by the processor, and computer program instructions stored in the memory and executable by the processor to perform monitoring and measuring metrics of system resource consumption of a plurality of entities in at least one computer system to generate resource consumption data, generating a report of the system resource consumption data for the plurality of entities for each of a plurality of time periods, identifying a number, k, of the plurality of entities as top-k consumers of computer system resources for each of the plurality of time periods, and identifying at least one residual entity of the plurality of entities whose resource consumption is not included in the top-k entities based on residual resource consumption data of the entity for the plurality of time periods. For example, in an embodiment, the method may further comprise resampling the reports of the system resource consumption data corresponding to the top-k entities and to the at least one residual entity to form at least one report covering a time period including the plurality of time periods.

For example, in an embodiment, a computer program product for monitoring computer system operation may comprise a non-transitory computer readable storage having program instructions embodied therewith, the program instructions executable by a computer, to cause the computer to perform monitoring and measuring metrics of system resource consumption of a plurality of entities in at least one computer system to generate resource consumption data, generating a report of the system resource consumption data for the plurality of entities for each of a plurality of time periods, identifying a number, k, of the plurality of entities as top-k consumers of computer system resources for each of the plurality of time periods, and identifying at least one residual entity of the plurality of entities whose resource consumption is not included in the top-k entities based on residual resource consumption data of the entity for the plurality of time periods. For example, in an embodiment, the method may further comprise resampling the reports of the system resource consumption data corresponding to the top-k entities and to the at least one residual entity to form at least one report covering a time period including the plurality of time periods.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
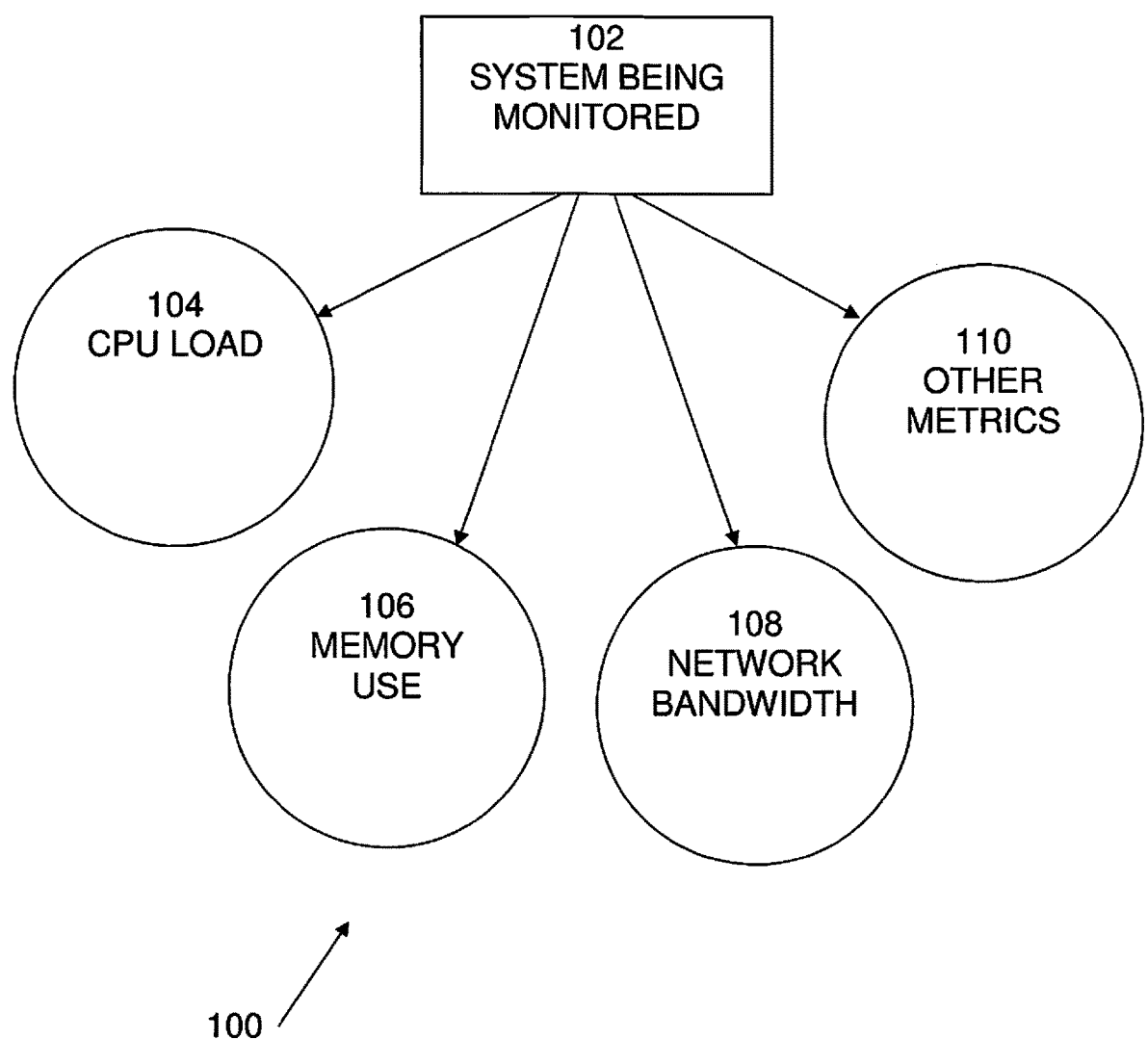
FIG. 1 is an exemplary block diagram of a computing environment in which described embodiments may be implemented.

An exemplary computing environment 100 is shown in FIG. 1. In this example, computing environment 100 may include one or more system(s) being monitored 102, and one or more metrics of system 102 that are being collected, such as CPU load 104, memory use 106, network bandwidth use 108, and other metrics 110. Such metrics may come in different types, such as absolute quantities, relative counters, absolute counters, etc. Collecting all these metrics from a large cluster computing system may require a significant amount of storage space. Storage space requirements may be reduced by resampling older metric data into a more coarse grained granularity. For metric types such as CPU load 104, memory use 106, network bandwidth use 108, etc., resampling may be relatively straightforward.

There may be other metric types 110 for which resampling may be more involved. For example, metric types that may capture the state of a computing cluster may include, for example, processes or entities that consume CPU time. Typically, metrics relating to the most significant entities may be reported. That is, metrics relating to the top-k entities may be reported. Like other metrics, top-k metrics may be resampled. However, as different entities may be included in, or excluded from, the top-k entities at different times, simply considering and resampling only the top-k metrics may produce inaccurate results. Accordingly, embodiments of the present methods and systems may consider metrics relating to entities other than those in the top-k, in order to produce more accurate resampled metrics.

Figure 2:
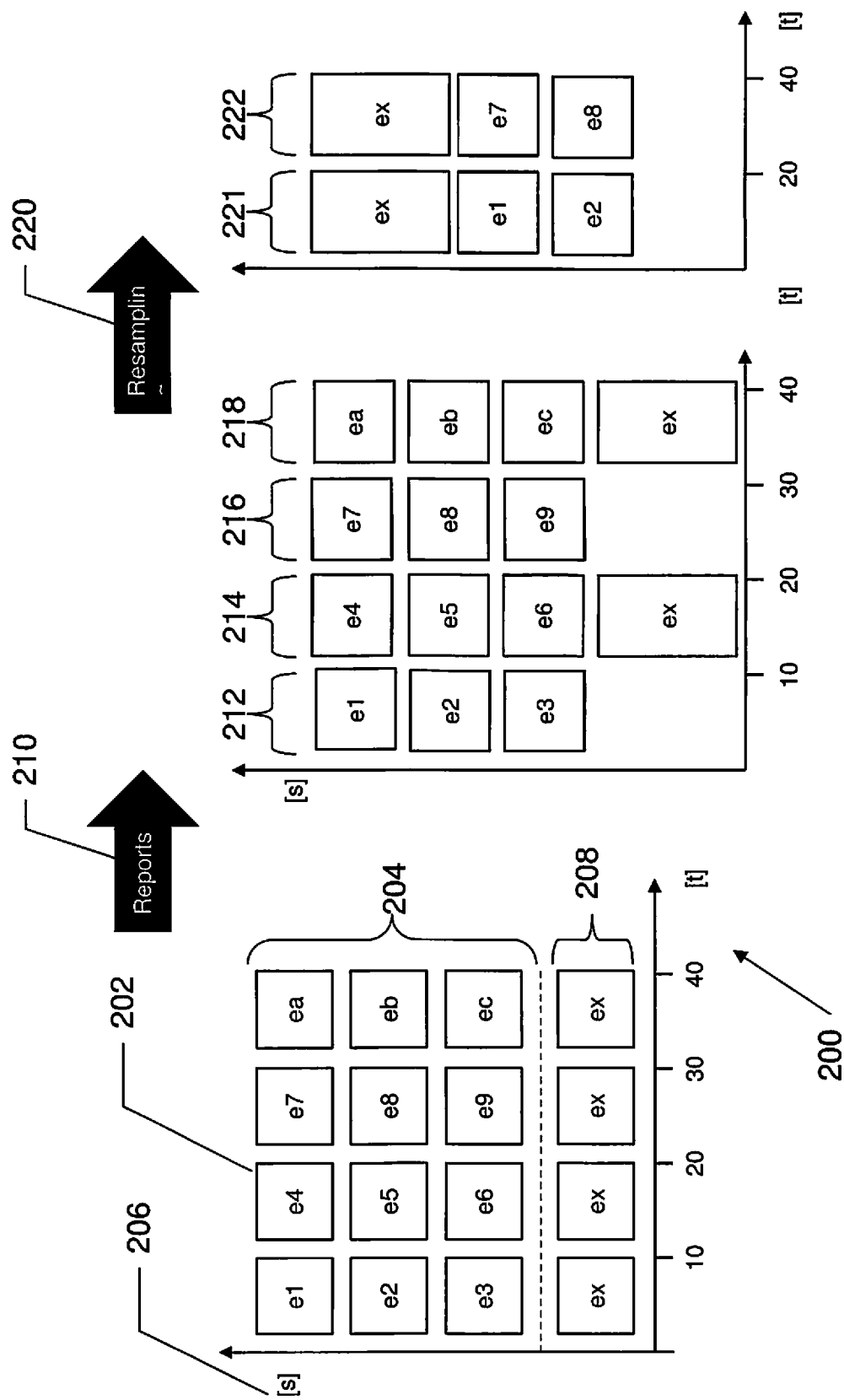
FIG. 2 is an exemplary diagram of sampling and resampling techniques that consider metrics relating to entities other than those in the top-k, according to embodiments described herein.

An example of a resampling technique 200 that considers metrics relating to entities other than those in the top-k is shown in FIG. 2. In the example shown in FIG. 2, there is a plurality of entities 202 executing or otherwise existing in a computer system. Among entities 202, there are, over time, a number of entities 204 that are in the top-k entities in terms of one or more metrics [s] 206. In this example, the particular entities that are included in the top-k entities may change over time. In addition, in this example, there may be an entity 208 that is not included in the top-k entities. Such entities may be included in residual resource consumption.

This data is collected by a monitoring system and used to generate the four reports which are shown in the middle of FIG. 2 (spanning the four time intervals 0-10, 10-20, 20-30, and 30-40). This data has not been resampled yet.

When reports 210 are generated, without resampling, reports 212, 214, 216, and 218 may be generated. In this example, report 212 includes information relating to entities e1, e2, and e3, and spans the time interval 0s-10s. Report 214 includes information relating to entities e4, e5, and e6, and spans the time interval 10s-20s. Report 216 includes information relating to entities e7, e8, and e9, and spans the time interval 20s-30s. Report 218 includes information relating to entities ea, eb, and ec, and spans the time interval 30s-40s. It is noted that the residual resource consumption for entity ex is included in the second report (the residual data is reported for the time period spanning 0-20s). Entity ex was not included in either the first report 212 or the second report 214 as a top-k item, but its residual resource consumption over both periods exceeds the resource consumption of the lowest other item in the second report and hence is reported in 214. Similarly, at the fourth report 218, the residual resource consumption of entity ex for the time period 20-40s is reported (0-20s was already reported in the second period).

An example of reports 221 and 222 generated after resampling 220 reports is shown in FIG. 2. In this example, two reports are resampled at a time. The sizes of the boxes indicate the amount of resource consumed in that timeframe. Accordingly, in reports 221, 222, entity ex is the top item. For example, in report 221, covering 0-20s, since entity ex had greater resource consumption in this period than any other entity, ex is the top entity, followed by entities e1 and e2, and entities e3, e4, e5, e6 are not included. The situation is similar for the second report, covering 20s-40s. In this report, ex is the top entity, followed by entities e7 and e8, and entities e9, ea, eb, ec are not included.

Examples of entities that may be included in resampled reports 221, 222 may include entities for which residual resource consumption is greater than the resource consumption of at least one top-k process, for at least some period of time, and for any top-k processes if residual resource consumption has been accumulated. As another example, resampled reports 221, 222 may include entities for which their residual resource consumption is greater than any top-k reported value. This may provide the capability to include the residual resource consumption in top-k reports, consider the residual resource consumption when resampling data, and again compute residual resource consumption data during resampling.

In an embodiment, during resampling, information for entities e3-e6 and e9-ec may be discarded. In another embodiment, the residual resource consumption may be computed again for any entities not considered in any resampled report and they may be included as residual resource consumption entities in a resampled report instead.

Figure 3:
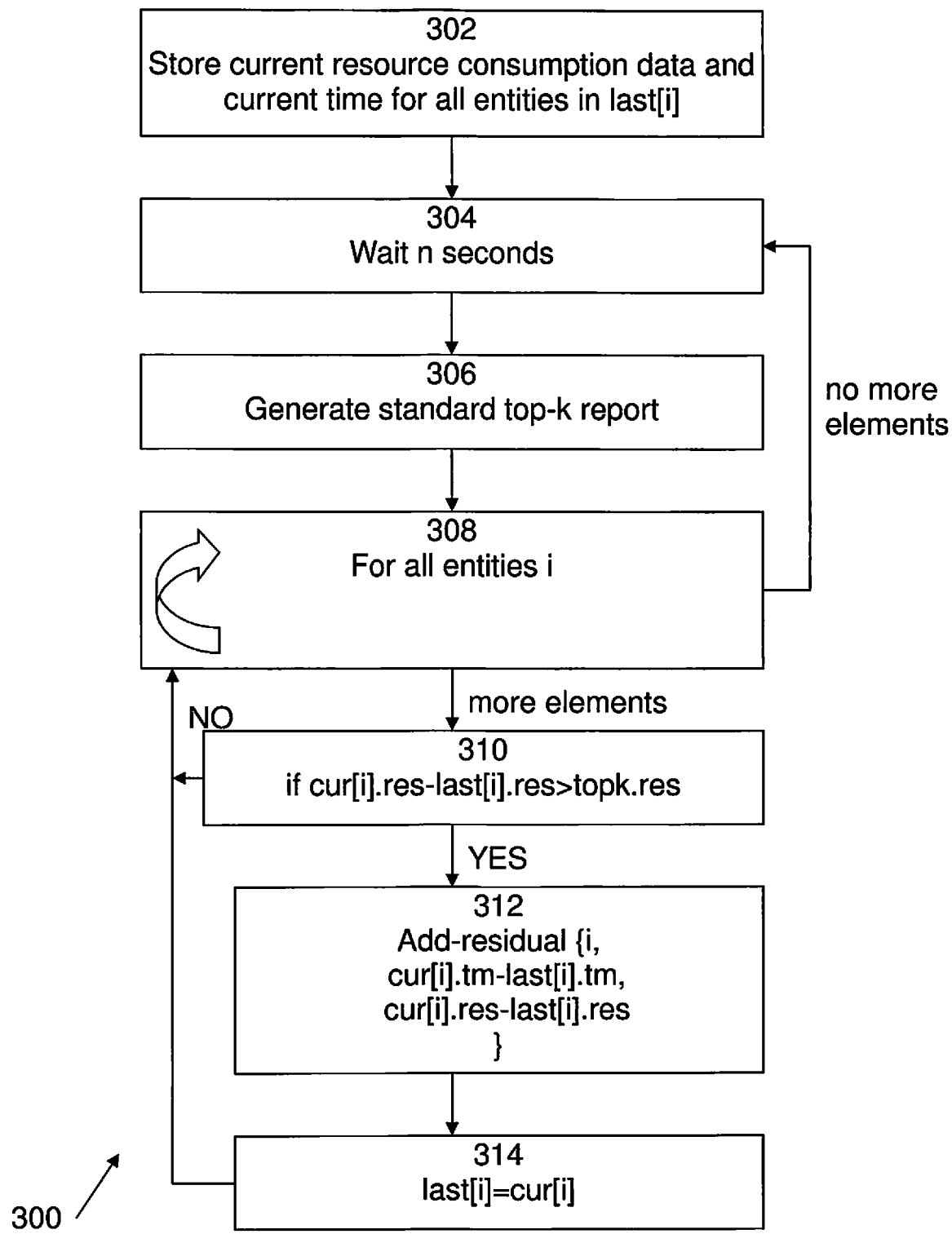
FIG. 3 is an exemplary flow diagram of a process of collection of the top-k and residual items, according to embodiments described herein.

An exemplary flow diagram of a process 300 of residual top-k generation is shown in FIG. 3. This process may be used to determine which entities should be included in a top-k report, including residual entities (entities with residual resource consumption). Process 300 begins with 302, in which current resource consumption data and current time for all entities in existence in the last time period, last[i], are stored. For example, such data may be stored in a data structure such as:

```
struct resdata{
    time_t tm;
    long res;
};
resdata cur[N], last[N];
```

At 304, in an embodiment, process 300 may wait for a time period, such as n seconds, the sampling period. At 306, a standard top-k report may be generated. At 308, a loop over all entities i may be entered. At 308, it may be determined whether there are more elements to process. If there are no more elements to process, then process 300 may continue at 304, at which process 300 may wait for a time period, such as n seconds. If there are more elements to process, then process 300 may continue with 310, in which it may be determined whether the current time period resources used by entity i ("cur[i].res"), minus the last time period resources used by entity i ("last[i].res"), is greater than the resources used by any top-k entity ("topk.res"). If not, then process 300 may continue at 308. If so, then process 300 may continue at 312, in which the residual resources may be added for entity i. For example, the time delta, "cur[i].tm-last[i].tm" may be computed. Likewise, the resource usage, "cur[i].res-last[i].res" may be computed. These computed quantities may be stored for entity i. At 314, the current resource usage for the entity i may be stored as the last time period resource usage for the entity i, and process 300 may continue at 308.

Figure 4:
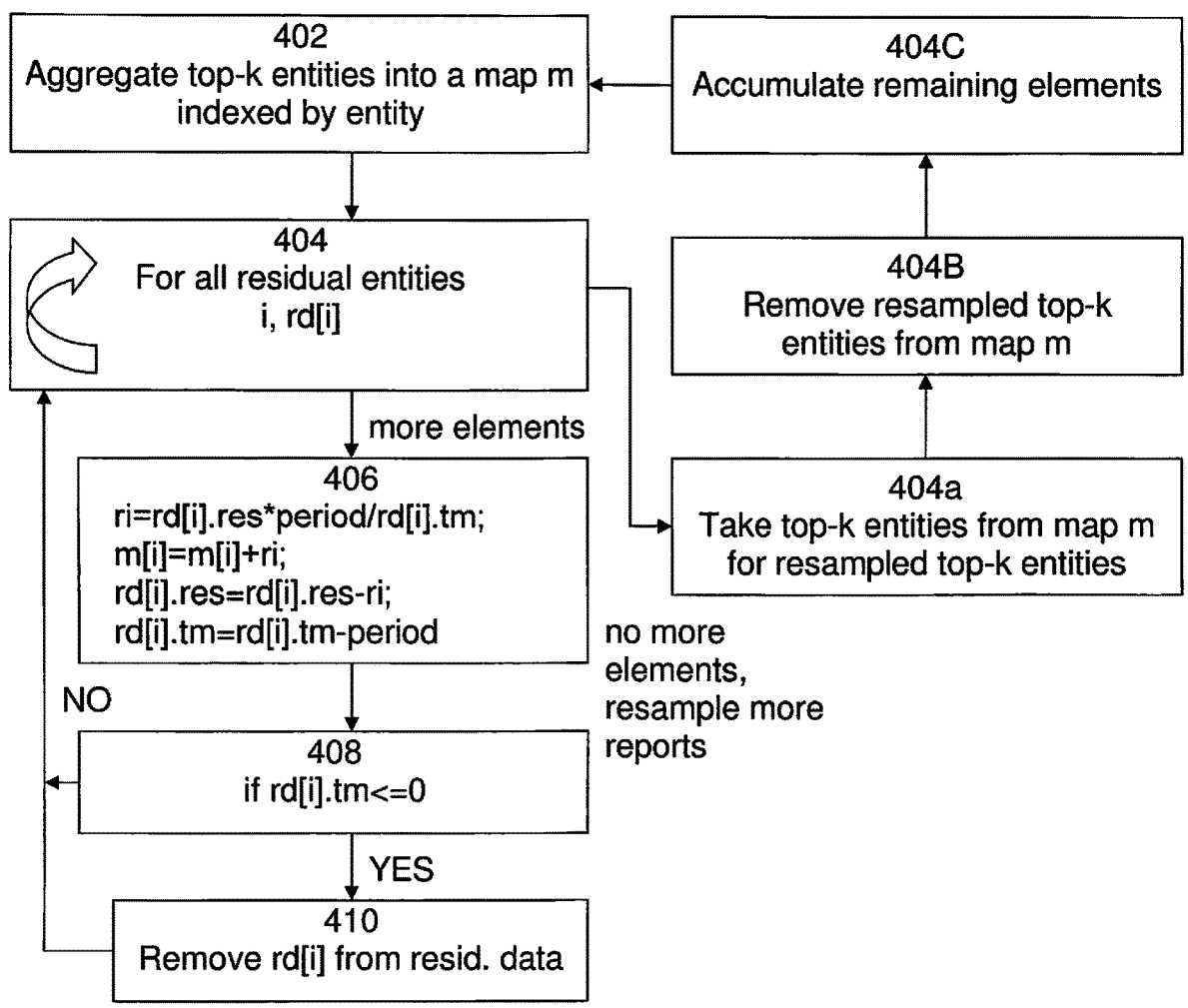
FIG. 4 is an exemplary flow diagram of a process of residual top-k resampling, according to embodiments described herein.

An exemplary flow diagram of a process 400 of residual top-k resampling is shown in FIG. 4. This process may be used to resample entities identified by process 300, shown in FIG. 3, including residual entities. In the example shown in FIG. 4, "rd" may represent the residual data of the set of reports to be resampled, and "period" may represent the time period over which the resampling of the reports may be performed.

Process 400 begins with 402, in which the top-k entities identified by process 300 may be aggregated. Typically, such top-k entities may be aggregated into a map m that may be indexed by entity. At 404, a loop may be entered over all residual entities "i", and using the residual data for each entity, "rd[i]". If, at 404, there are no more elements to be processed, then process 400 returns to 402 to perform the resampling process for other reports via 404a, 404b, and optionally, 404c. At 404a, the top-k entities may be taken from map m to be the resampled top-k entities. At 404b, the resampled top-k entities may be removed from map m. At 404c, optionally, the remaining elements in map m may be accumulated with previous such data in a residual resource consumption map $m_{res}$. This map may again be used to add residual resource consumption data to the resampled reports. Performing 404c allows the data of otherwise discarded elements to be kept as residual resource consumption data. As a result, this enables repeated resampling of a set of resampled reports. If that is not necessary, then any elements that are taken into account by 404c may be discarded.

If, at 404, there are more elements to be processed, then process 400 continues with 406, in which residual resource resampling is performed. The value "ri" may be computed as "rd[i].res*period/rd[i].tm". An updated value of "m[i]" may be computed as "m[i]+ri". An updated value of "rd[i].res" may be computed as "rd[i].res-ri". An updated value of "rd[i].tm" may be computed as "rd[i].tm-period".

At 408, it may be determined whether the remaining residual time, "rd[i].tm" is less than or equal to zero. If so, then at 410, the residual data for the entity being resampled, "rd[i]" may be removed from the residual data. If not, then the residual data for the entity being resampled, "rd[i]" is kept and process 400 loops back to 404 to process additional entities.

Figure 5:
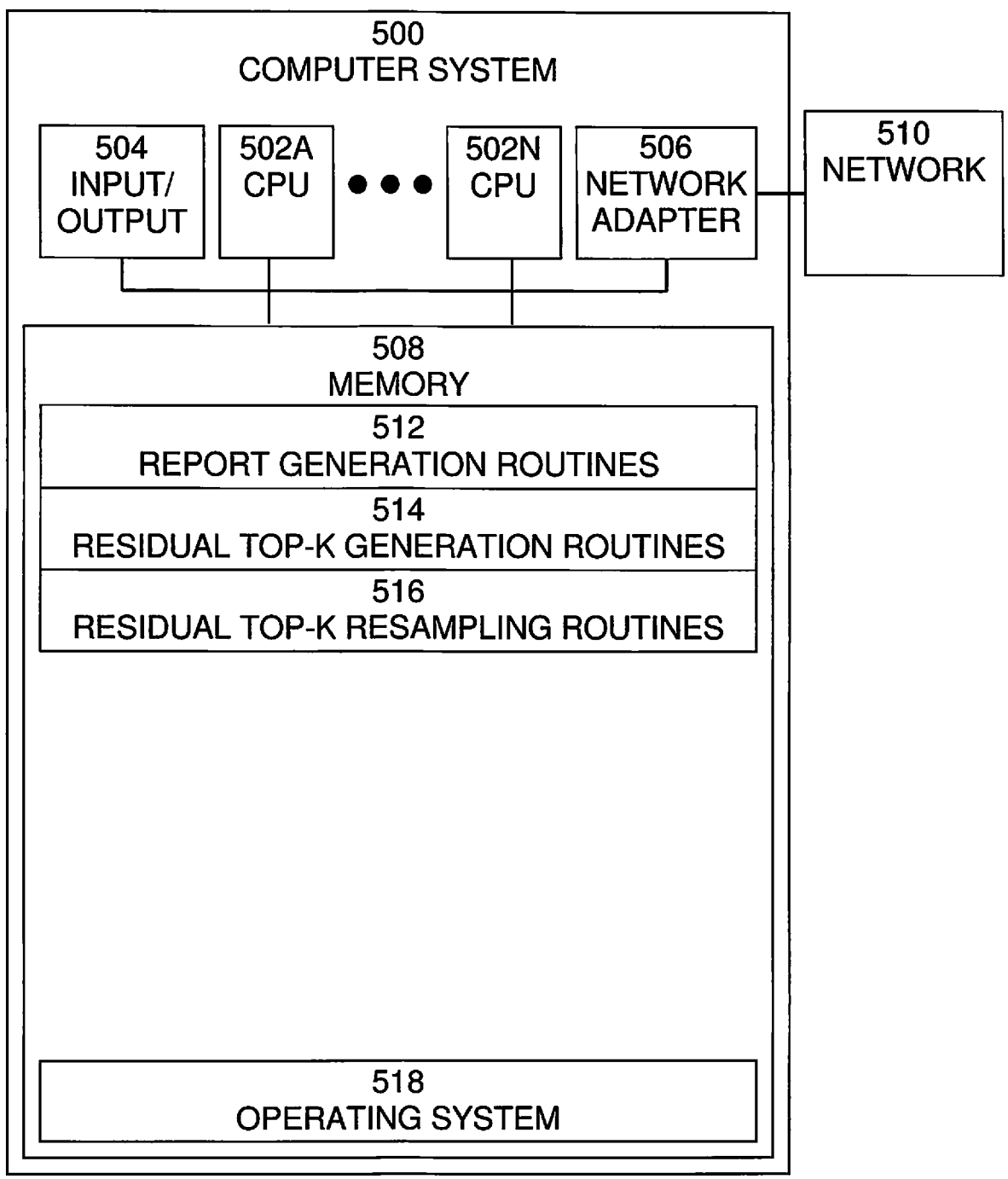
FIG. 5 is an exemplary block diagram of a computer system in which processes involved in the embodiments described herein may be implemented.

An exemplary block diagram of a computer system 500, in which processes involved in the embodiments described herein may be implemented, is shown in FIG. 5. Computer system 500 is typically a programmed general-purpose computer system, such as an embedded processor, system on a chip, personal computer, workstation, server system, and minicomputer or mainframe computer. Likewise, computer system 500 may be implemented in a communication device, such as a network switch, router, traffic distributor, etc. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include report generation routines 512, residual top-k generation routines 514, residual top-k resampling routines 516, and operating system 518. For example, report generation routines 512 may include routines that provide the capability to monitor and measure metrics and generate reports based on those metrics. Residual top-k generation routines 514 may include routines that provide the capability to determine which entities should be included in a top-k report, including residual entities (entities with residual resource consumption). Residual top-k resampling routines 516 may include routines that provide the capability to resample entities identified to be included in the top-k entities, including residual entities. Operating system 518 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for monitoring system operation comprising:
    monitoring and measuring, using a hardware processor of at least one computer system, metrics of system resource consumption of a plurality of entities in the at least one computer system to generate resource consumption data;
    generating, using the hardware processor, a report of the system resource consumption data for the plurality of entities for each of a plurality of time periods;
    identifying, using the hardware processor, a number, k, of the plurality of entities as top-k consumers of computer system resources for each of the plurality of time periods;
    capturing, using the hardware processor, long term resource consumption data of an entity of the plurality of entities other than the top-k entities, said long term resource consumption data of the entity being stored as residual resource consumption data;
    determining, using the hardware processor, based on said residual resource consumption data for each entity of the plurality of entities other than the top-k entities, whether the resources used by the entity accumulated over the plurality of time periods is greater than the resources used by any top-k entity during any of the plurality of time periods;
    identifying, using the hardware processor, at least one residual entity of the plurality of entities as an entity whose accumulated resource consumption over said plurality of time periods is greater than the resources used by any of the top-k entities based on residual resource consumption data of the entity for the plurality of time periods; and
    resampling, using the hardware processor, the reports of the system resource consumption data corresponding to the top-k entities and to the identified at least one residual entity to generate at least one report covering a time period including the plurality of time periods, said generated at least one report reflecting a state of said at least one computing system with increased accuracy.

2. The method of claim 1, wherein long term resource consumption data is used during resampling to provide consideration of long term resource consumption not included in resource consumption of the top-k entities.

3. The method of claim 1, wherein residual resource consumption data captures long term resource consumption data of an entity that was included in the top-k entities, but is no longer included in the top-k entities due to the resampling.

* * * * *